United States Patent
Kim et al.

(10) Patent No.: US 9,671,657 B2
(45) Date of Patent: Jun. 6, 2017

(54) ELECTRONIC DEVICE AND ARRANGEMENT OF COMPONENTS THEREOF

(71) Applicant: LG Electronics Inc., Seoul (KR)

(72) Inventors: Hyunkook Kim, Seoul (KR); Hyunghoon Oh, Seoul (KR); Sukho Hong, Seoul (KR); Sanghak Lee, Seoul (KR); Donghan Yoon, Seoul (KR); Minho Park, Seoul (KR); Jekwang Youn, Seoul (KR); Kwanghyun Ahn, Seoul (KR); Cheongsun Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 14/626,672

(22) Filed: Feb. 19, 2015

(65) Prior Publication Data

US 2015/0241729 A1 Aug. 27, 2015

(30) Foreign Application Priority Data

Feb. 27, 2014 (KR) .................. 10-2014-0023580

(51) Int. Cl.
  *G02F 1/1345* (2006.01)
  *G02F 1/1335* (2006.01)
  *G02F 1/1333* (2006.01)

(52) U.S. Cl.
  CPC ............................ *G02F 1/13452* (2013.01)

(58) Field of Classification Search
  CPC ............ G02F 1/13452; G02F 1/13338; G02F 1/133603; G02F 1/133528; G02F 1/133514; G02F 1/13458
  See application file for complete search history.

(56) References Cited

U.S. PATENT DOCUMENTS

2012/0052919 A1 3/2012 Yoo et al.
2013/0279303 A1 10/2013 Kaltenrieder et al.

FOREIGN PATENT DOCUMENTS

KR 20-0124260 Y1 10/1998
KR 10-2008-0039612 A 5/2008
KR 10-2010-0121057 A 11/2010

*Primary Examiner* — Joseph L Williams
(74) *Attorney, Agent, or Firm* — Dentons US LLP

(57) ABSTRACT

Provided is a mobile terminal including: an LCD module arranged under a window; an LCD circuit board arranged to one side of the LCD module to electrically control the LCD module; a printed circuit board formed apart from the LCD circuit board, positioned under the LCD module and the LCD circuit board, and electrically connected to the LCD circuit board; and a connector electrically connecting the LCD circuit board and the printed circuit board, in which multiple conductive pads arranged at a predetermined distance are formed on the LCD circuit board and the printed circuit board, respectively, conductive regions and non-conductive regions are formed on the connector alternately, and the conductive regions are connected to the conductive pads formed on the LCD circuit board and the printed circuit board, respectively.

20 Claims, 20 Drawing Sheets

ELECTRONIC DEVICE AND ARRANGEMENT OF COMPONENTS THEREOF

CROSS-REFERENCE TO RELATED APPLICATION

Pursuant to 35 U.S.C. §119(a), this application claims the benefit of earlier filing date and right of priority to Korean Application No. 10-2014-0023580, filed on Feb. 27, 2014, the contents of which is incorporated by reference herein in its entirety.

BACKGROUND OF THE DISCLOSURE

1. Field of the Disclosure

The present disclosure relates to a mobile terminal that has a construction in which an LCD circuit board and a main printed circuit board are connected to each other.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

In the related art, an LCD circuit board and a main printed circuit board are connected to each other in a board-to-board manner. Accordingly, components that are mounted onto the LCD circuit board are exposed to the outside. Thus, the components occupy much space, thereby increasing the thickness of a mobile terminal.

SUMMARY OF THE DISCLOSURE

Therefore, an aspect of the detailed description is to provide to provide a mobile terminal in which components are mounted onto one surface of an LCD circuit board and components are mounted to one side or both sides of a connector, thereby preventing an increase in the thickness of the mobile terminal.

To achieve these and other advantages and in accordance with the purpose of this specification, as embodied and broadly described herein, there is provided a mobile terminal including: an LCD module arranged under a window; an LCD circuit board arranged to one side of the LCD module to electrically control the LCD module; a printed circuit board formed apart from the LCD circuit board, positioned under the LCD module and the LCD circuit board, and electrically connected to the LCD circuit board; and a connector electrically connecting the LCD circuit board and the printed circuit board, in which multiple conductive pads arranged at a predetermined distance are formed on the LCD circuit board and the printed circuit board, respectively, conductive regions and non-conductive regions are formed on the connector alternately, and the conductive regions are connected to the conductive pads formed on the LCD circuit board and the printed circuit board, respectively.

In the mobile terminal, the connector may be inserted into a guide panel that has a first through hole, and thus is fixed, in which a base member may be arranged between the LCD circuit board and the printed circuit board, and a second through hole that communicates with the first through hole may be formed in the base member, and the connector may pass through the first through hole and the second through hole.

In the mobile terminal, the LCD module may include an LCD panel including a polarizing plate and a color filter substrate, and a back light unit that is arranged under the LCD panel to supply light to the LCD panel, and a drive IC chip that driving the LCD module may be provided between the LCD panel and the LCD circuit board.

In the mobile terminal, a cover that covers the LCD circuit board may be provided between the window and the LCD circuit board.

In the mobile terminal, the backlight unit may include LEDs, an LED circuit board that controls the LED may be connected to the LCD circuit board, and LED nesting portions in which the LEDs are received may be formed in the guide panel.

In the mobile terminal, components that are mounted onto one surface of the LCD circuit board may be formed to one side or both sides of the connector.

In the mobile terminal, the conductive region may be connected to one of an upper surface, a lower surface, a flank surface of the conductive pad of the LCD circuit board.

In the mobile terminal, an upper protrusion wing and a lower protrusion wing may be provided on an upper surface and a lower surface, respectively, and may be connected to the conductive pads of the LCD circuit board and the conductive pads of the printed circuit board, respectively.

In the mobile terminal, the connector may be "C"-shaped or "H"-shaped by the upper protrusion wing and the lower protrusion wing.

In the mobile terminal, a base member may be arranged between the LCD circuit board and the printed circuit board, the LCD circuit board may be formed to a portion of a bottom surface of the base member enclosing an end portion of the base member, and the connector may be connected to a lower surface of the LCD circuit board.

In the mobile terminal, a groove may be formed in at least one of the LCD circuit board and the printed circuit board, and the conductive pad protruded in the groove may be electrically connected to the conductive region of the connector.

In the mobile terminal, the conductive pad is formed on a flank surface or a bottom surface of the groove.

In the mobile terminal, the conductive pad may be in the form of an elastic semi-sphere or in the form of a plate.

In the mobile terminal, both end portions of the cover may extend downward, and hooks formed on both ends of the cover may be inserted into grooves formed in the guide panel.

In the mobile terminal, the drive IC chip and components mounted onto the LCD circuit board may be connected with each other by connection lines.

In the mobile terminal, the drive IC chip and the components mounted onto the LCD circuit board may be arranged on regions that correspond to each other when the drive IC chip and the LCD circuit board are separated, respectively.

In the mobile terminal, a first adhesive member that sticks the LCD module and the window may be provided at an upper portion of the LCD module, and a second adhesive member that sticks the window and the cover may be provided between the widow and the cover.

In the mobile terminal, the connector may be an elastic member.

In the mobile terminal, a protrusion or a groove may be formed on or in both ends or a middle portion of the connector, and a groove or a protrusion may be formed in or on the guide panel, and the connector may be inserted into the guide panel and thus may be held in place.

In the mobile terminal, the connector may have a step along the vertical direction in order to prevent the connector from leaving from the guide panel.

In the mobile terminal, the connector may include a first arrangement is formed of the alternating multiple conductive regions and non-conductive regions, a second arrangement that is formed of the alternating multiple non-conductive regions and multiple conductive regions, and an insulating layer that is positioned between the first arrangement and the second arrangement to provide electrical insulation between the first arrangement and the second arrangement.

In the mobile terminal, a touch detection unit may be built in the LCD module, and an adhesive sheet may be provided between the window and the LCD module.

In the mobile terminal, the adhesive sheet has a hole in the center.

Effects of the mobile terminal and the method of controlling the mobile terminal according to the present invention is as follows, According to at least one of the embodiments of the present invention, an LCD circuit board and a printed circuit board are connected to each other with a corrugated connection. This provides an advantage of mounting components onto one surface of the LCD circuit board.

In addition, according to at least one of the embodiments of the present invention, the components are mounted to one side or both sides of the corrugated connector, thereby improving space occupancy.

Effects that are accomplished according to the present invention are not limited to those described above, and effects that are not described above will be apparent to a person of ordinary skill in the art from the following description.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
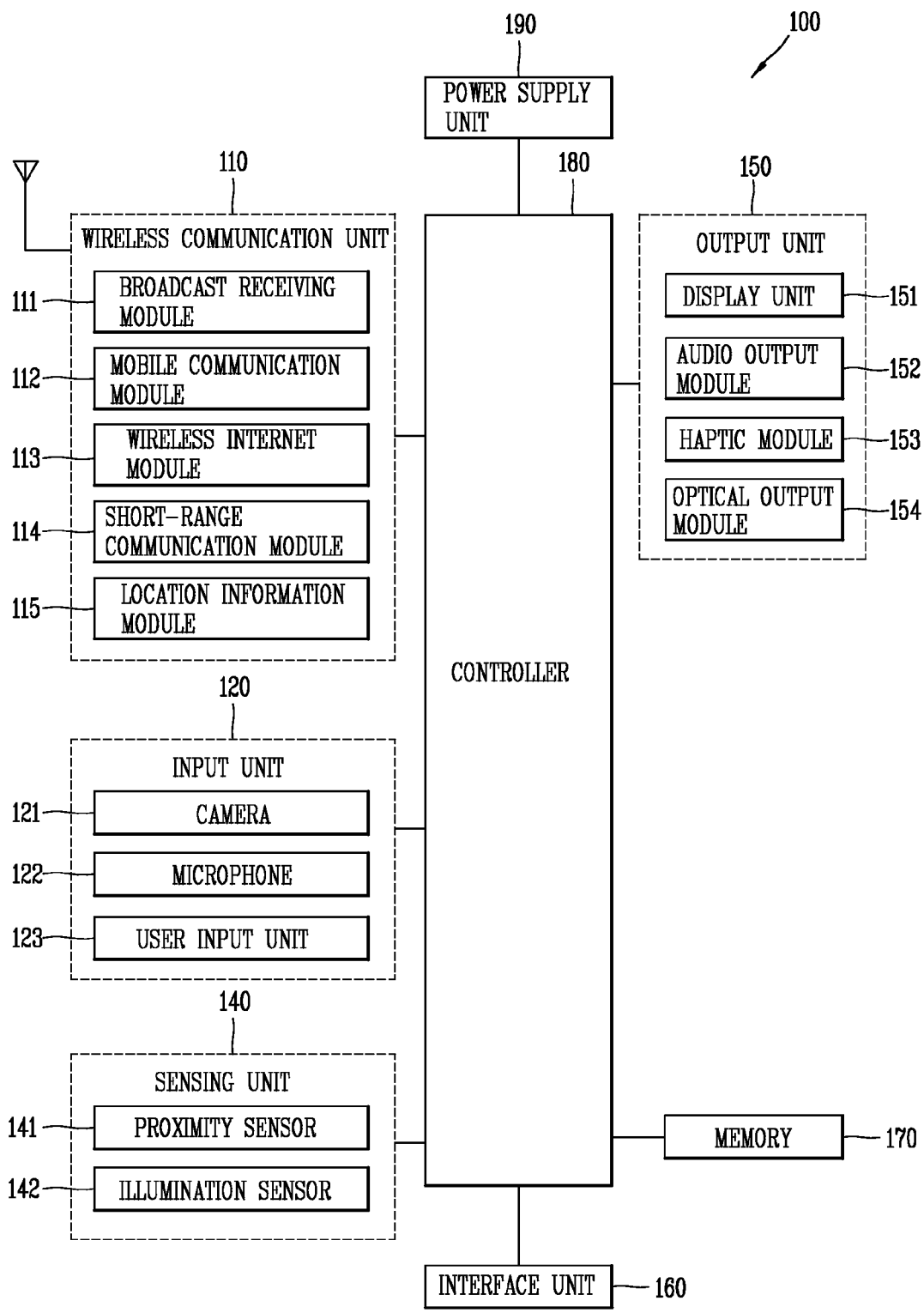
FIG. 1A is a block diagram for describing a mobile terminal according to the present invention.
Figure 1B:
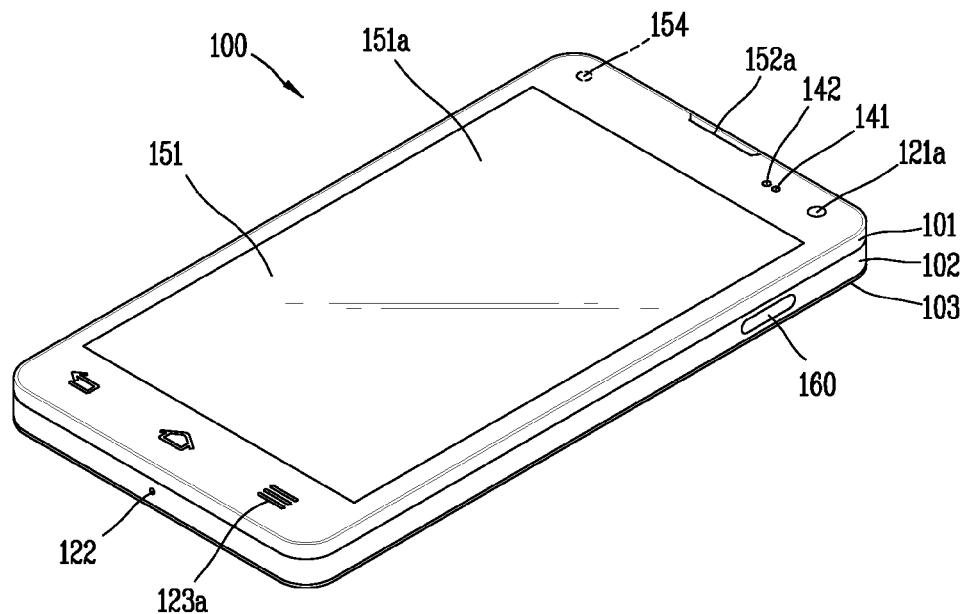
FIGS. 1B and 1C are diagrams of one example of the mobile terminal according to the present invention, when viewed from different angles.
Figure 1C:
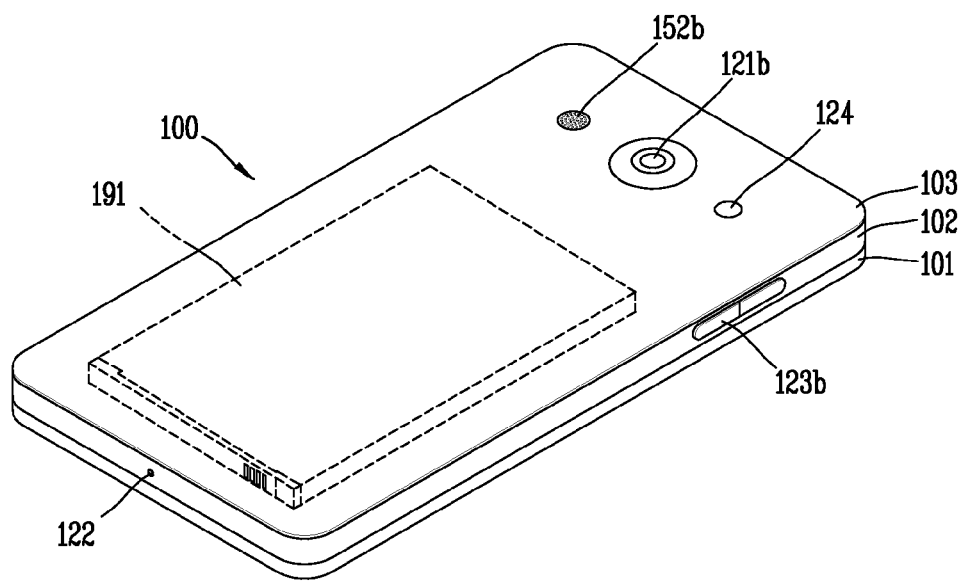

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal according to one embodiment of the present invention will be described below referring to the accompanying drawings.

It is apparent to a person of ordinary skill in the art that modifications to the present invention are possible in the scope that does not depart from the nature and essence of, and the gist of the present invention.

Figure 2:
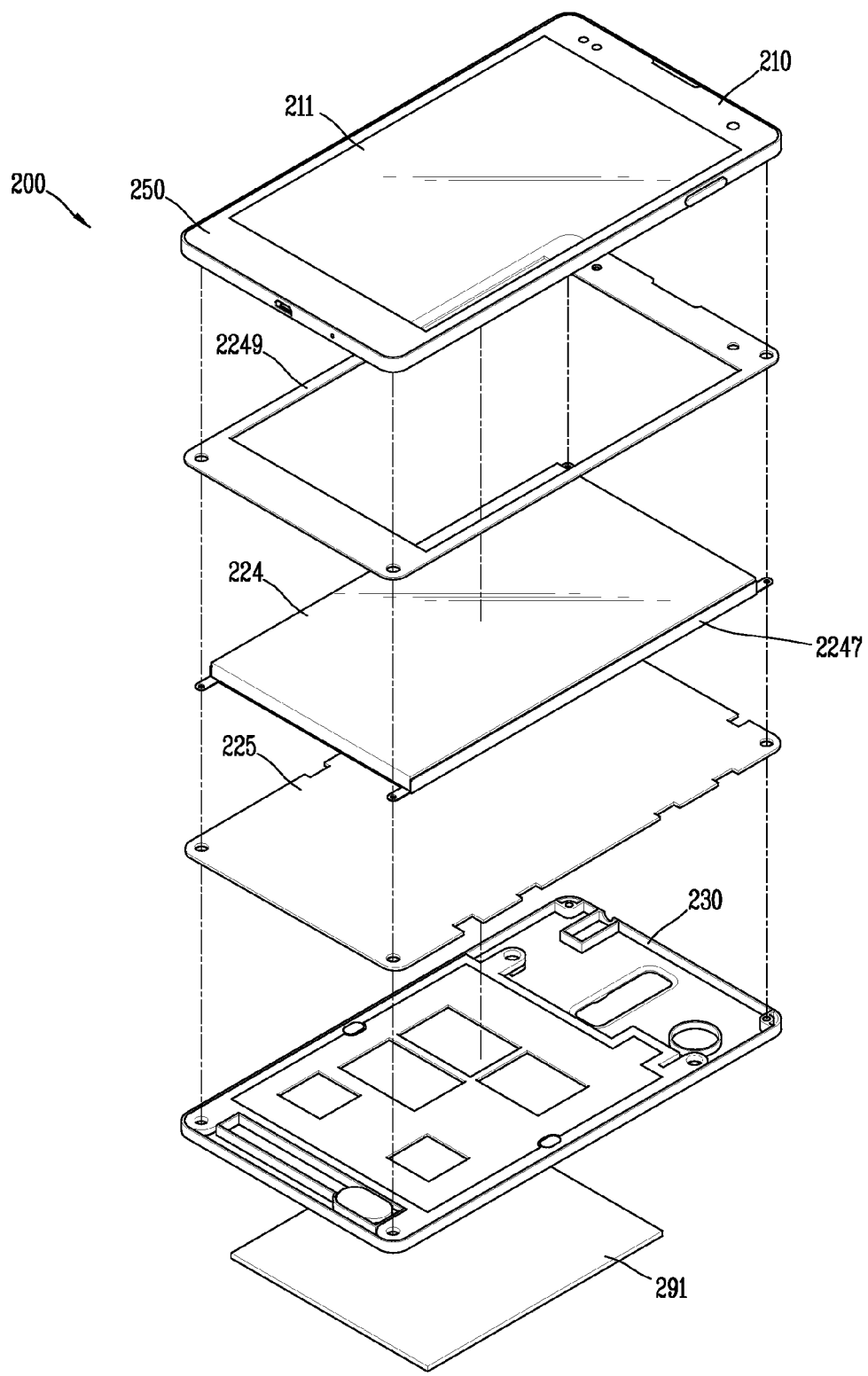
FIG. 2 is a perspective exploded diagram of a mobile terminal according to one embodiment of the present invention.
Figure 3:
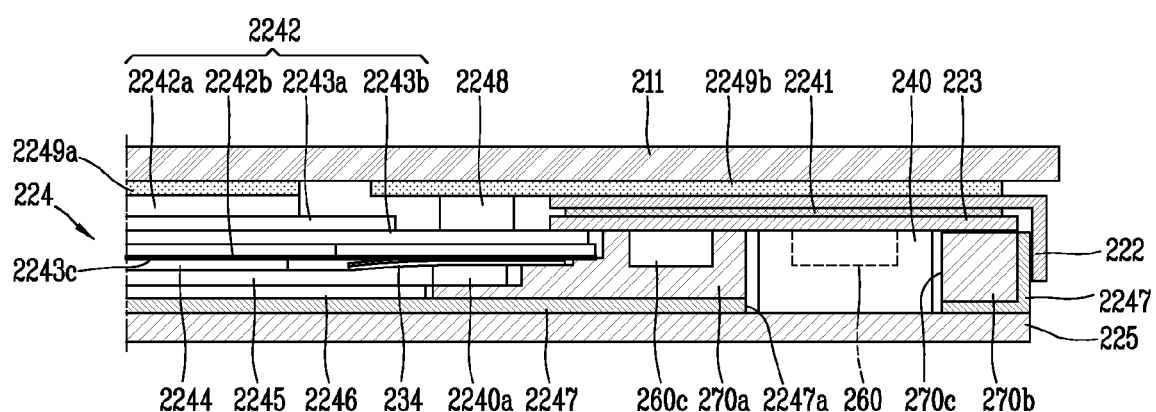
FIG. 3 is a cross-sectional diagram of one portion of the mobile terminal according to one embodiment of the present invention.
Figure 4:
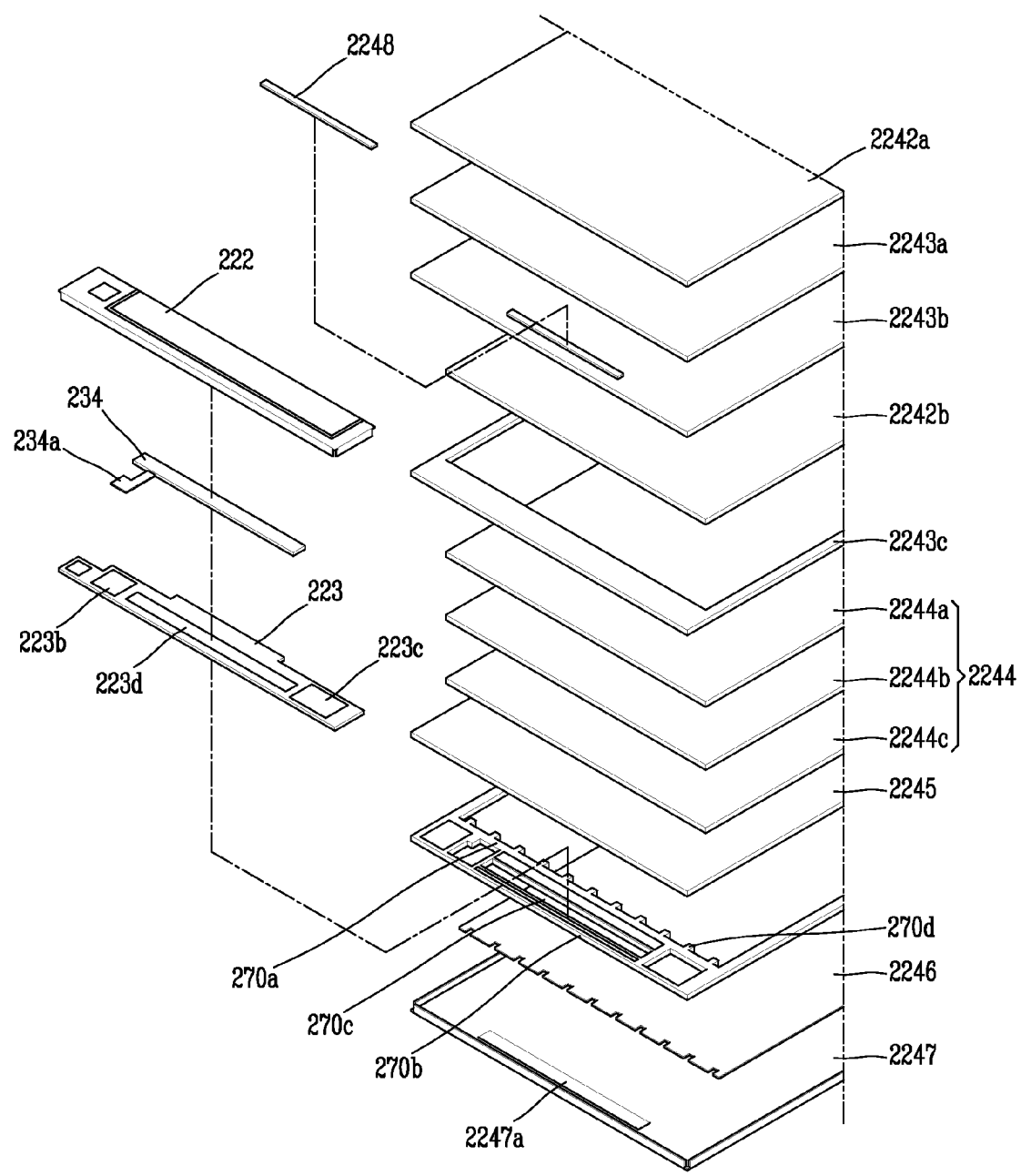
FIG. 4 is a perspective exploded diagram of an LCD module according to one embodiment of the present invention.

FIG. 2 is a schematic perspective exploded diagram of the mobile terminal according to one embodiment of the present invention, FIG. 3 is a cross-sectional diagram of one portion of a mobile terminal 200 according to one embodiment of the present invention, FIG. 4 is a perspective exploded diagram of an LCD module according to one embodiment of the present invention, The mobile terminal 200 is described below referring to FIGS. 2 to 4.

The mobile terminal 200 according to one embodiment of the present invention includes a first cover 210, of which a surface makes up a front external appearance of the mobile terminal 200, and a second cover 230. Various electronic components are provided between the first cover 210 and the second cover 230, Typical examples of the electronic component include an LCD module 224 and a printed circuit board 225, The present invention is not limited to the mobile terminal 200 with this configuration, but can be applied to all mobile terminal 200 in which the LCD circuit board 223 and the printed circuit board 225 are a distance away and are electrically connected with each other.

A window 211 is arranged over an upper end of the mobile terminal 200 according to one embodiment of the present invention. The LCD module 224 is arranged under the window 211. The LCD module 224 is configured to include two polarizing plates 2242a and 2242b, an LCD panel 2242, and a backlight (BLU) 2240. The LCD module 2242 includes two color filter substrates 2243a and 2243b that are arranged between the polarizing plates 2242a and 2242b. The backlight unit (BLU) 2240 is arranged under the LEC panel 2242 and supplies light to the LEC module 2242.

The backlight unit (BLU) 2240 includes an optical sheet 2244, a light guide plate 2245, a light source 2240a, and a reflection sheet 2246. The optical sheet 2244 includes a light blocking tape 2243a, prism sheets 2244a and 2244b, and a diffusion sheet 2244c. The blocking tape 2243a is arranged under the LCD panel 2242 to supply light only to a predetermined area. The prism sheets 2244a and 2244b are positioned under the light blocking tape 2243a to collect light and thus to improve luminance. The diffusion sheet 2244c diffuses light uniformly. The light guide plate 2245 is positioned under the optical sheet 2244 to guide incident light to the LCD panel 2242 arranged in a higher position. The light source 2240a is arranged to one side of the light guide plate 2245. Light from the light source 2240a propagates along the light guide plate 2245. The reflection sheet 2246 is arranged under the light guide plate 2245. The light source 2240a may be an LED.

According to the present embodiment, as an example of the LCD module 224, a thin film transistor liquid crystal display (TFT LCD) is disclosed, but the present invention is not necessarily limited to this.

For example, the LCD modules 224 include a liquid crystal display (LCD), an organic light-emitting diode (OLED), a flexible display, a 3D display and the like.

A connection of the LCD circuit board 223 and the printed circuit board 225 according to one embodiment of the present invention will be described in more detail below.

The mobile terminal 200 according to one embodiment of the present invention is configured to include the LCD module 224, the LCD circuit board 223, the printed circuit board 225, and a connector 240. The LCD module 224 is arranged under the window 211. The LCD circuit board 223 is arranged to one side of the LCD module 224 to electrically control the LCD module 224. The printed circuit board 225 is formed to be a distance away from the LCD circuit board 223, is positioned under the LCD module 224, and is electrically connected to the LCD circuit board 223. The connection 240 electrically connects the LCD circuit board 223 and the printed circuit board 225.

According to one embodiment, as the connector 240, a corrugated connector 240 is used that is formed of alternating conductive regions 240a and non-conductive regions 240b. The corrugated connector 240 is arranged in guide panels 270a and 270b, each of which has a first through hole 270c. At this point, the printed circuit board 225 controlling the mobile terminal 200 is positioned under a base member 2247, The base member 2247 is made of stainless steel (SUS) and thus reinforces strength of the LCD module 224, A second through hole 2247a, through which the connector 240 passes, is formed in the base member 2247, the LCD circuit board 223 and the printed circuit board 225 are connected to each other through the second through hole 2247a, That is, the guide panel 270 and the base member 2247 are formed in such a manner that the first through hole 270c and the second through hole 2247a are connected to each other, and thus connector 240 is arranged within the first and second through holes 270c and 2247a.

A cover is provided between the window 211 and the LCD circuit board 223. A drive IC chip 2248 with a predetermined height, which drives the LCD module 224, is provided to one side of the LCD module 224. The connector 240 is provided under the LCD circuit board 223 and is formed on a lower portion of a bezel 250 of the mobile terminal 200. Referring to FIG. 4, the LCD circuit board 223 is formed on a lower portion of the mobile terminal 200. At this point, more specifically, as one example, the drive IC chip 2248 is formed on the color filter substrate (2243b).

An LED circuit substrate 234 is electrically connected to the LCD circuit board 223 through the connection terminal 234a. The light source 2240a may be an LED. The LEDs are nested within multiple LED nesting portions 270 formed in the guide panel 270, respectively. At this point, the connector 240 is inserted passing through the first through hole 270c formed in the guide panel 270 and the through hole 2247a formed in the base member 2247.

At this point, a gap that results from the thickness of the drive IC chip 2248 is formed between the window 211 and the drive IC chip 2248. According to one embodiment of the present invention, the cover is provided to fill the gap. If the cover 222 is not provided, a distance between the window 211 and the drive IC chip 2248 is smaller than a distance between the window 211 and the LCD circuit board 223, creating an imbalance in height, That is, according to the present invention, the cover 222 is provided to compensate for a difference in height that results from the thickness of the drive IC chip 2248 arranged to one side of the color filter substrate 2243a in the LCD panel 224.

In addition, an adhesive member 2249 is provided on a bottom surface of the window 211. That is, a first adhesive member 2249a that sticks the window 211 to the LCD panel 2242 is arranged and a second adhesive member 2249a is provided between the window 211 and the cover 222. Thus, the cover 222 is fastened to the window 211, thereby accomplishing a balance in height.

The drive IC chip 2248 is an integrated circuit for driving the LCD module 224, and is a component that provides a drive signal and data, as electrical signals, to the LCD panel 2242 in order to display image information, character information, or the like on the window 211.

According to one embodiment of the present invention, the corrugated connector 240 is used to electrically connect the LCD circuit board 223 and the printed circuit board 225. The corrugated connector 240 is a connector that is formed by alternating the conductive region 240a and the non-conductive region 240b multiple times. According to one embodiment of the present invention, the corrugated connector 240 is made of an elastic member.

Figure 5A:
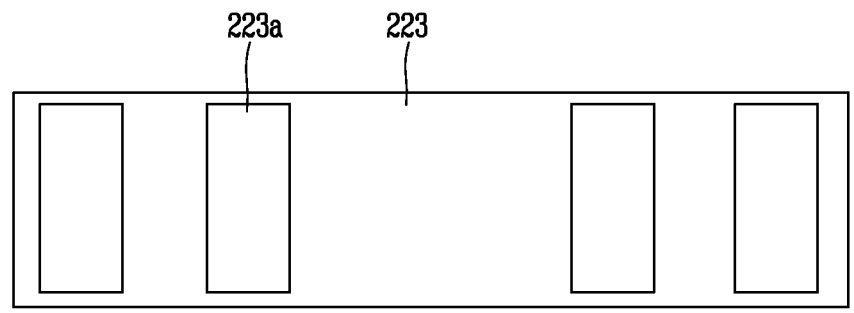
FIGS. 5A to 5C are plane diagrams of an LCD circuit substrate, a connector, and a printed circuit board according to one embodiment.
Figure 5B:
Figure 5C:
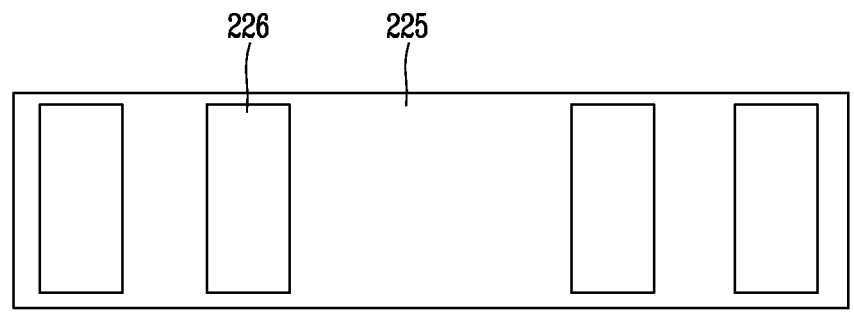

FIGS. 5A to 5C are diagrams for describing a connection of the connector 240, the LCD circuit board 223, and the printed circuit board 225 according to one embodiment of the present invention. As illustrated in FIGS. 5A to 5C, the multiple conductive regions 240a of the connector 240 are electrically connected to a first pad 223a and a second pad 226.

The drive IC chip 2248 is electrically connected to components 260, 260a, and 260b that are mounted onto the LCD circuit board 223 to receive an electrical signal and thus to drive the LCD module 224.

According to one embodiment, the connector 240 is arranged on a lower end of the drive IC chip 2248, and the drive IC chip 2248 may be mounted onto the LCD circuit substrate 223, At this point, multiple components 260, 260a, and 260b are mounted onto the LCD circuit board 223. As one component, a capacitor 260c is mounted onto the LCD circuit board 223. The capacitor 260 performs a function of reducing or preventing a malfunction of a touch input and at the same time stabilizing electrical performance.

In addition to the capacitor 260c, the multiple capacitors 260, 260a, and 260b are mounted onto the LCD circuit board 223. According to one embodiment of the present invention, the components 260, 260a, and 260b are arranged to one side or both sides of the connector 240, At this point, the components may be formed on only one surface of the LCD circuit board 223, A cushion tape 2241 is arranged between the cover 222 and the LCD circuit board 223 to absorb an impact between the cover 222 and the LCD circuit board 223, This is possible because the components 260, 260a, 260b, and 260c are formed on only one surface of the LCD circuit board 223, On the other hand, according to one embodiment of the present invention, a light blocking tape 2244 is provided between the LCD panel 2242 and the light guide plate 2245.

According to one embodiment of the present invention, the drive IC chip 2248 and the component 260 mounted onto the LCD circuit board 223 are electrically connected to each other. When division into a region onto which the drive IC chip is mounted and a region onto which the component 260 is mounted is done, a left side of the region onto which the drive IC chip 2248 is mounted is connected to a left side of the region onto which the component 260 is mounted, in such a manner that the drive IC chip 2240 and the component 260 are arranged in the regions that correspond to each other, respectively, This is done in order to minimize a length of a connection line 2248c.

Figure 7A:
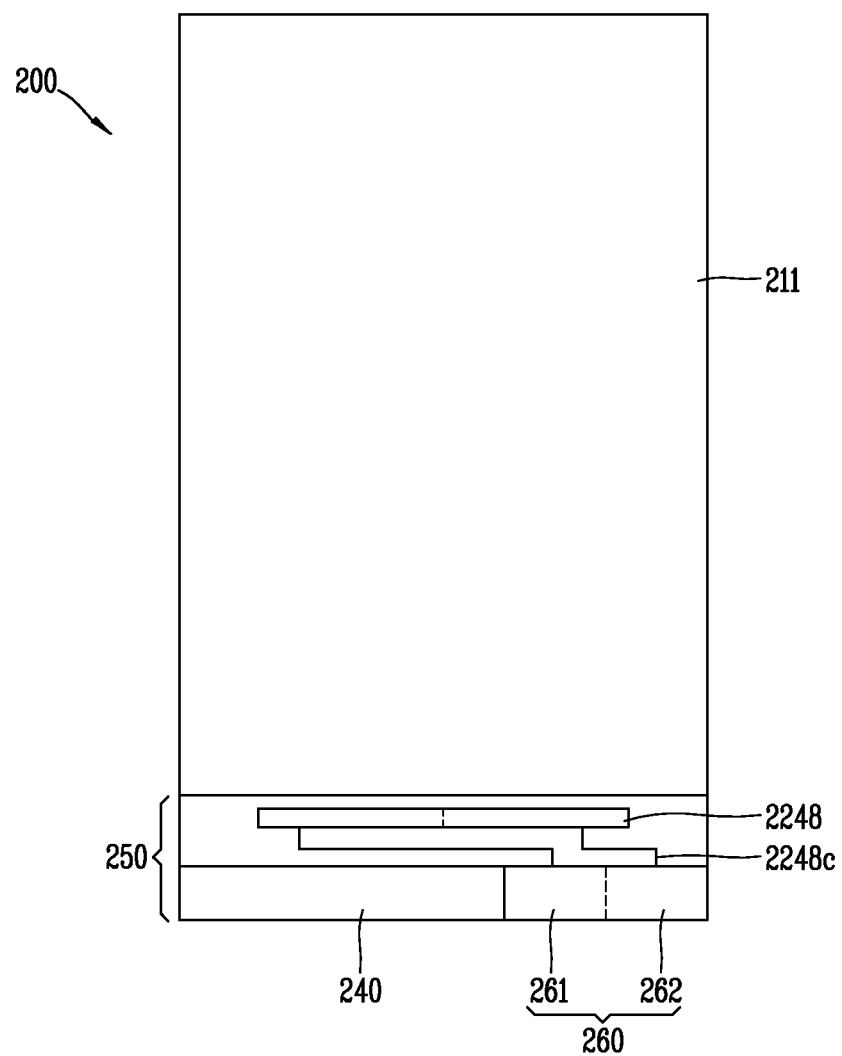
FIG. 7A is a plane diagram of the mobile terminal from which a cover according to one embodiment of the present invention is removed.
Figure 7B:
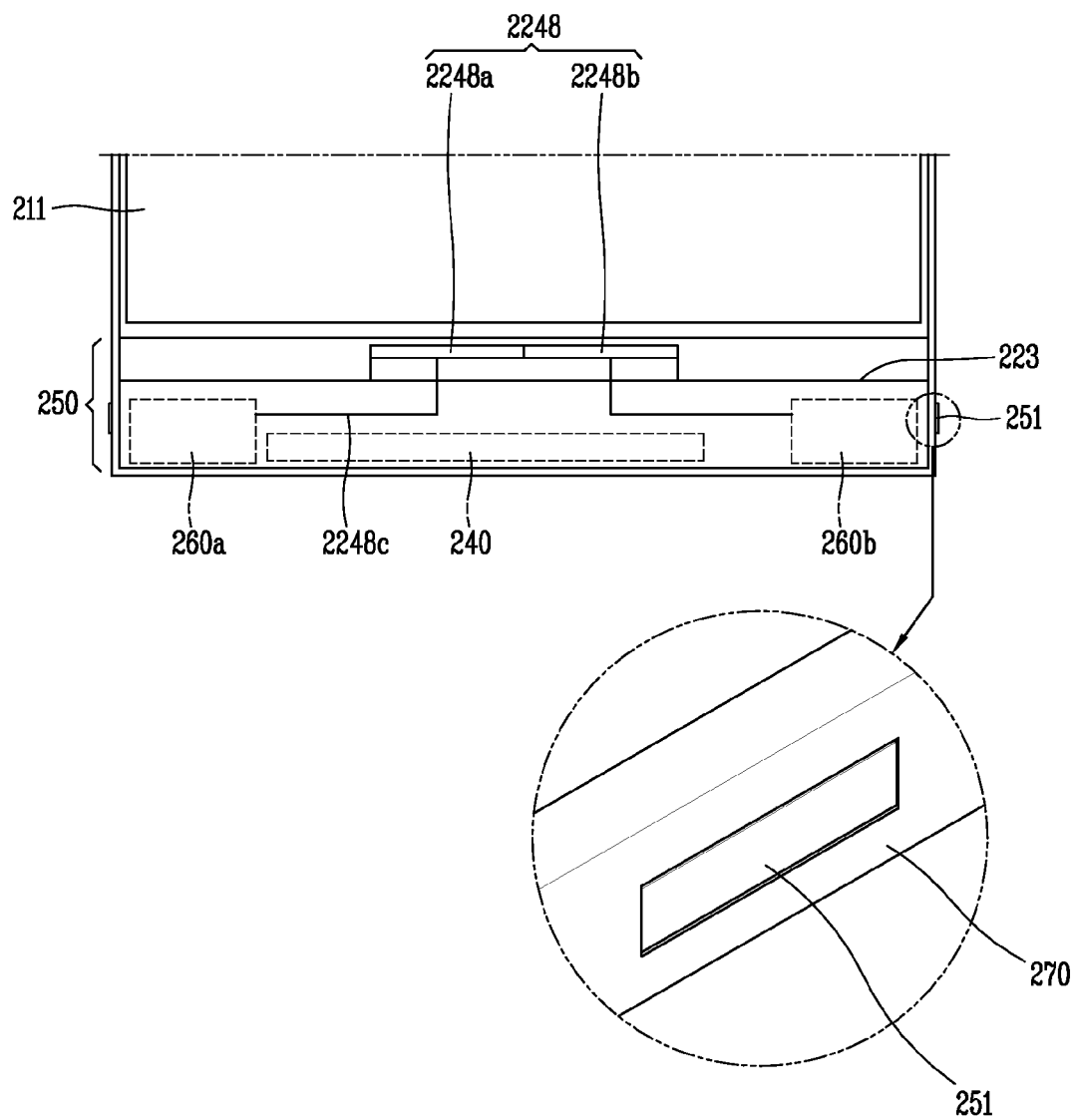
FIG. 7B is a plane diagram of one portion of the mobile terminal from which the cover according to one embodiment of the present invention is removed.
Figure 8:
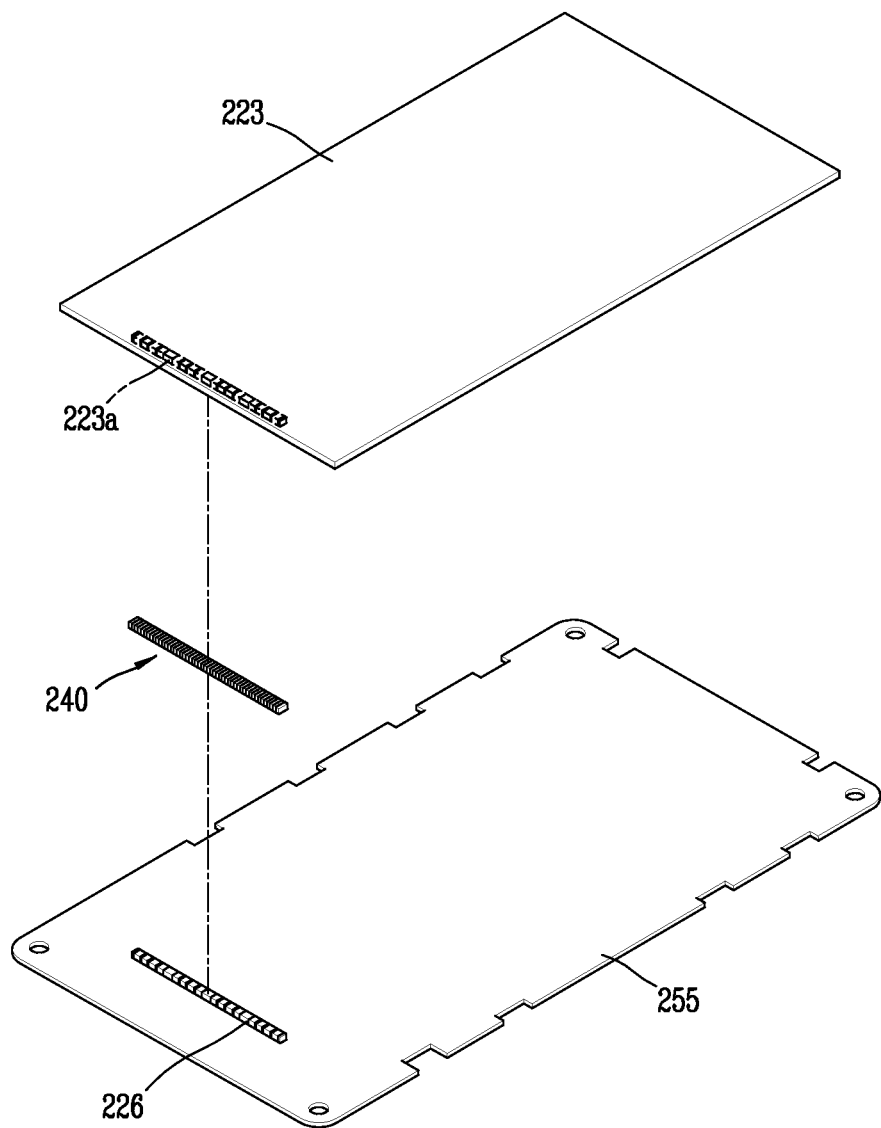
FIG. 8 is a perspective diagram of the LCD circuit board and the printed circuit board according to one embodiment of the present invention that are not yet connected to each other.
Figure 9:
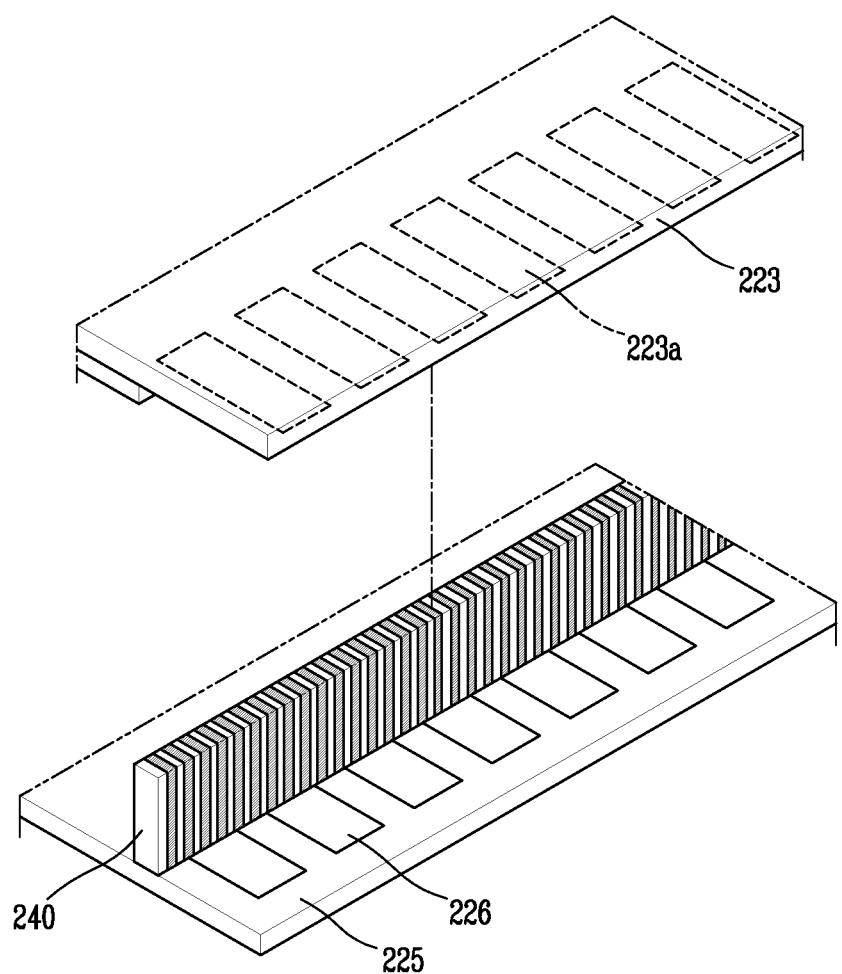
FIG. 9 is a perspective diagram of the LCD circuit board and the printed circuit board according to one embodiment of the present invention that are connected to each other.

FIG. 7A illustrates that the connector 240 is arranged to the left of the lower portion of the bezel 250. FIG. 7B illustrates that the connector 240 is arranged on the middle of the lower portion of the bezel 250.

At this point, the drive IC chip is connected to the LCD circuit board 223, and other components 260, 260a, 260b, 261, 262 are arranged on a lower portion of the LCD circuit board 223 for the connection to the drive IC chip 2248, The connector 240 is arranged on one side of the bezel 250 or on the middle of the bezel 250. In a case where the connector 240, as illustrated in FIG. 7A, is arranged on one side of the bezel 250, the component 260 is arranged to one side of the connector 240. Then, a left-side component 261 that makes up the component 260 is connected to the left side of the drive IC chip 2248 and a right-side component 262 that makes up the components 260 is connected to the right side of the drive IC chip 2248.

In addition, as illustrated in FIG. 7B, in a case where the connector 240 is positioned on a lower middle portion of the bezel 250, the components 260a and 260b are divided into two parts. The two parts are arranged to both sides of the connector 240, respectively.

In the case where the connector 240, as described above, is arranged on the lower middle portion of the bezel 250, considering the connection lines 2248c, each of which connects the drive IC chips 2248 and each of the components 260a and 260b, the components are divided in such a manner that a left-side portion 2248a of the drive IC chip 2248 is easily connected to the components 260a that are arranged to the left of the connector 240 and a right-side portion 2248b of the drive IC chip 2248 is easily connected to the components 260b that are arranged to the right of the connector 240.

The components 260 and the drive IC chip 2248 each are described above as being divided into two parts, but the present invention is not limited to this. It is apparent that the components 260 and the drive IC chip 2248 each may be divided into three parts or four parts in order to connect the regions that correspond to each other. The division includes not only division in terms of a physical appearance, but also division in terms of an arrangement.

If the components that perform a function associated with the left-side portion 2248a of the drive IC chip 2248 are arranged to the right of the connection 240, the connection lines 2248c that connect the drive IC chips 2238 and the components 260a have to be lengthened. As illustrated in FIG. 7A, in a case where the connector 240 is formed on one side of the lower portion of the bezel 240, the components 260 have to be arranged on regions 261 and 262 that correspond to regions 2248a and 2248b of the drive IC chip 2248, respectively, However, in a case where the connector 240 is positioned to one side, the connection line 2248c has to be more lengthened, and this provides a disadvantage in the processing. Thus, it is desirable that the connection 249 be arranged on the middle of the lower middle portion of the bezel 250, The connection of the regions that correspond to each other is, for example, when the drive IC chip 2248 is divided into n parts and the n parts are numbered 1, 2, 3, and so forth from the left, the components 260 are divided into n parts and the n parts are number 1, 2, 3, and so forth from the left, and the portion of the drive IC chip and the components on the parts numbered the same number are connected to each other.

At this point, as illustrated in FIG. 7B, the connector 240 is provided between the components 260a and 260b, and the components 260a and 260b are arranged to the left and the right of the connector 240, respectively, As illustrated in FIG. 4, component mounting regions 223b and 224c are provided on the both sides of the LCD circuit board 223.

On the other hand, pads that are arranged predetermined distances apart are formed on the LCD circuit board 223 and the printed circuit board 225. The pad that is formed on the LCD circuit board 223 is hereinafter referred to as a first pad 223a and the pad that is formed on the printed circuit board 225 is referred to as a second pad 226.

As illustrated in FIGS. 5A to 5C, the first pad 223a and the second pad 226 are the same in width, and multiple conductive regions 240a that are formed on the connection 240 are connected to each of the first pad 223a and the second pad 226, According to one embodiment, the number of conductive regions 240a is 3 to 7 based on functions that are performed on the mobile terminal. However, in a case where many more functions are performed, many more conduction regions 240a have to be connected to the first pad 223a and the second pad 226.

Figure 14:
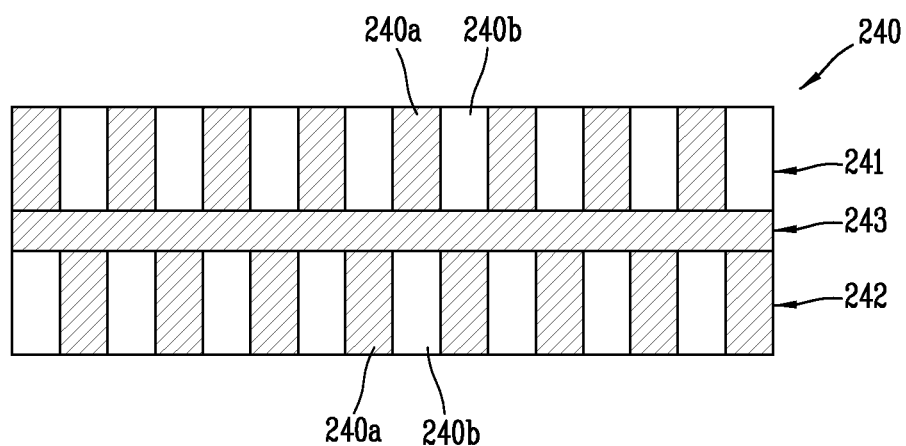
FIG. 14 is a diagram of a shape of the connector according to one embodiment of the present invention.

FIG. 14 illustrates the connection 240 according to one embodiment of the present invention in preparation for a case where many of the conductive regions 240a are necessary, Referring to FIG. 14, the connector 240 according to one embodiment of the present invention is configured to include a first arrangement 241, a second arrangement 242, and an insulating layer 243. The first arrangement 241 is formed of the alternating multiple conductive regions 240a and non-conductive regions 240b. The second arrangement 242 is formed of the alternating multiple non-conductive regions 240b and multiple conductive regions 240a. The insulation layer 243 is positioned between the first arrangement 241 and the second arrangement 242 to provide electrical insulation between the first arrangement 241 and the second arrangement 242.

FIG. 5A illustrates the LCD circuit board 223. FIG. 5B illustrates the connector. FIG. 5C illustrates the printed circuit board 225. In the connection 240 illustrated in FIG. 5B, the conductive regions 240a and the non-conductive regions 240b are formed on the same plane. Thus, a width (a length in FIG. 5B) of the connection 240 has to be increased in order to increase the number of the conductive regions 240a. However, as illustrated in FIG. 14, the number of the conductive regions 240a can be increased twofold with the same width being maintained, That is, if the number of the conductive regions 240a in the first arrangement 241 is n, the number of the conductive regions 240a in the second arrangement 241 is n. Thus, a total of 2n of the conductive regions 240a is formed in the connector 240 in FIG. 14. This makes the connector 240 suitable for performing various functions.

At this point, the connector 240 has elasticity. According to one embodiment of the present invention, a groove 245 may be formed on the LCD circuit board 223 or the printed circuit board 225 and then the connection 240 may be inserted into the groove 245, At this point, the conductive pads 226a and 228b may be arranged in a flank surface or a bottom of the groove 245, and may be brought into contact with the conductive region 240a of the connection 240, At this point, the groove 245 may be formed in only one of the LCD circuit board 223 and the printed circuit board 225 or may be formed in both of the LCD circuit board 223 and the printed circuit board 225. The conductive pad 226 may be elastic in the form of an elastic semi-sphere or in the form of a plate.

Figure 6A:
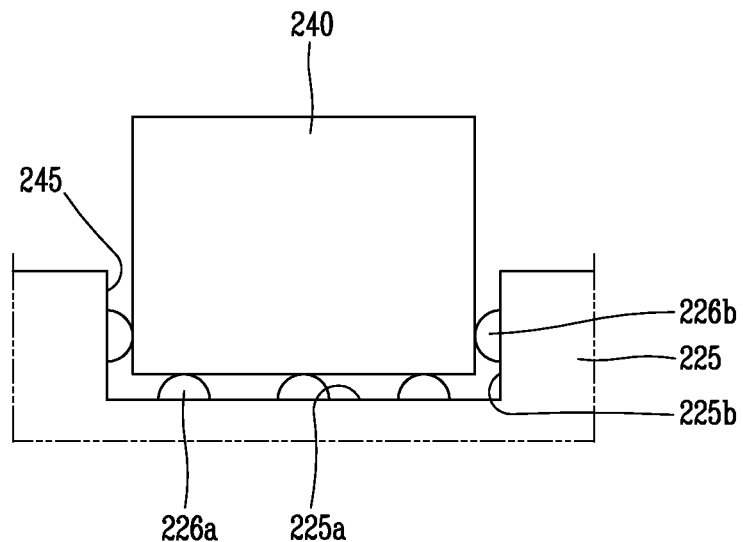
FIGS. 6A to 6C are cross-sectional diagrams of a connector according to one embodiment of the present invention and a printed circuit board that are connected to each other.

A case will be described below where the groove 245 is formed in the printed circuit board 225, FIG. 6A illustrates that the conductive pads 226a and 226b in the form of an elastic semi-sphere are formed in each of a bottom 225a and a flank surface 225b of the printed circuit board 225. One of the adjacent conductive regions 240a is connected to the conductive pad 226b that is formed in the flank surface 225b, and the other is connected to the conduction pad 226a that is formed in the bottom 225a.

Figure 6B:
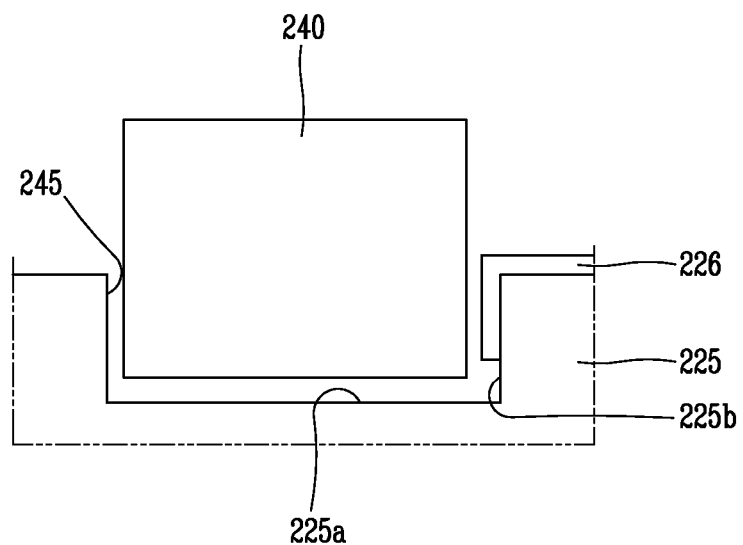
Figure 6C:
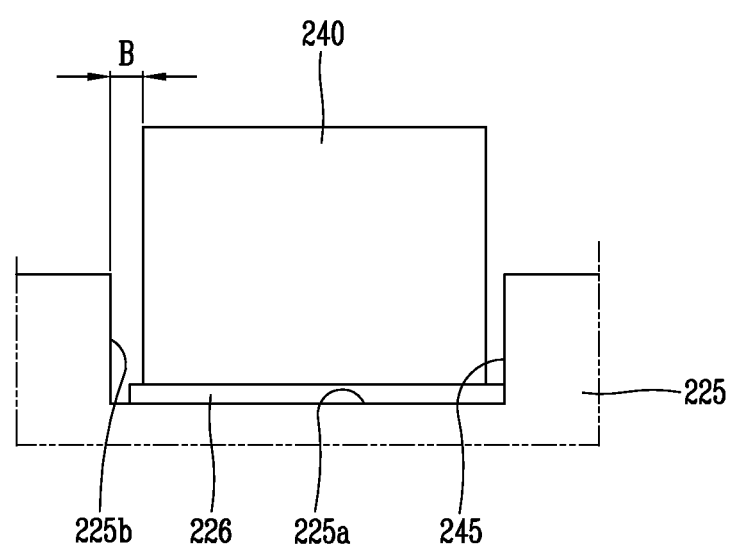

Then, FIG. 6B illustrates that the conductive pad 226 in the form of a plate is formed in the flank surface 225b of the printed circuit board 225 for an electrical connection to a flank surface of the connector 240. FIG. 6C illustrates that the conductive pad 226 in the form of a plate is formed in the bottom 225a of the printed circuit board 225 for an electrical connection to a bottom of the connector 240.

In addition, as illustrated in FIG. 6C, the connector 240 has elasticity and thus has a buffer region B in the horizontal direction. This is in preparation for a case where a volume expands when the connection 240 is brought into contact with the conductive pad 226. Thus, a phenomenon where, when a volume expands in a fixed space, the connector 240 is crushed and thus poor contact occurs can be prevented.

In addition, according to one embodiment of the present invention, both end portions of the cover 222 extends downward, and hooks are formed on the end portions of the cover 222, respectively. The hooks are inserted, for combination, into grooves 251 formed in the guide panel 270, respectively.

Referring to FIG. 3, the base member 2247 is provided to reinforce the strength, most of the components including the LCD module 224 are placed on the base member 2247. An end portion of the base member 2247 extends upward and thus a space in which the guide panel 270b is nested is provided inward from the right of the upward-extending end portion. The printed circuit board 225 is arranged under the base member 2247.

Figure 10A:
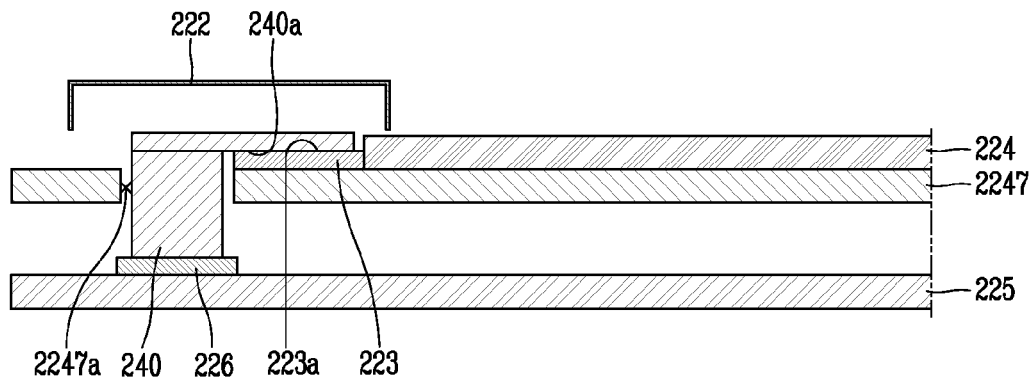
FIGS. 10A-10E and 11A-11B are cross-sectional diagrams of the connector and the LCD circuit board according to one embodiment of the present invention.
Figure 10B:
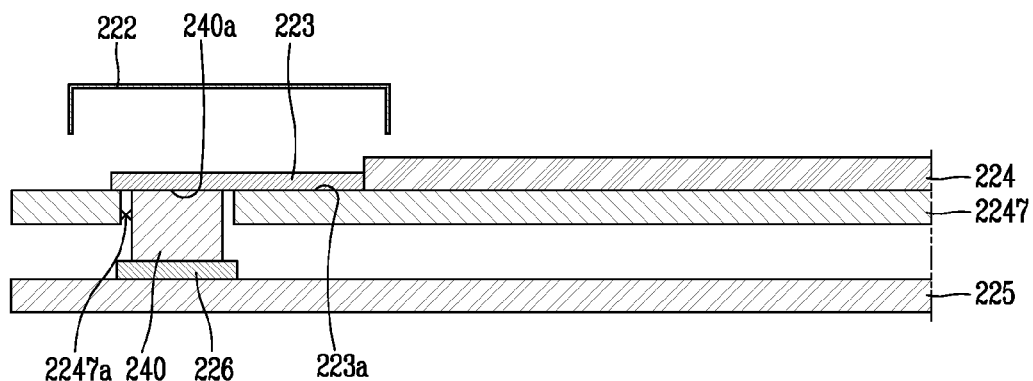
Figure 10C:
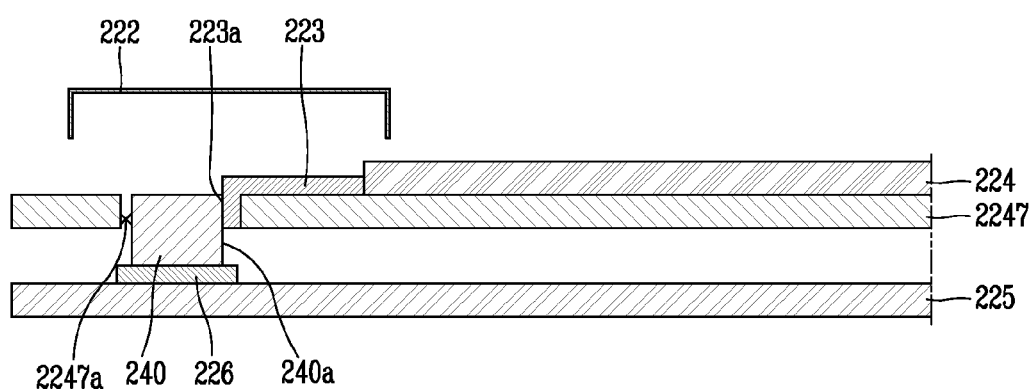
Figure 10D:
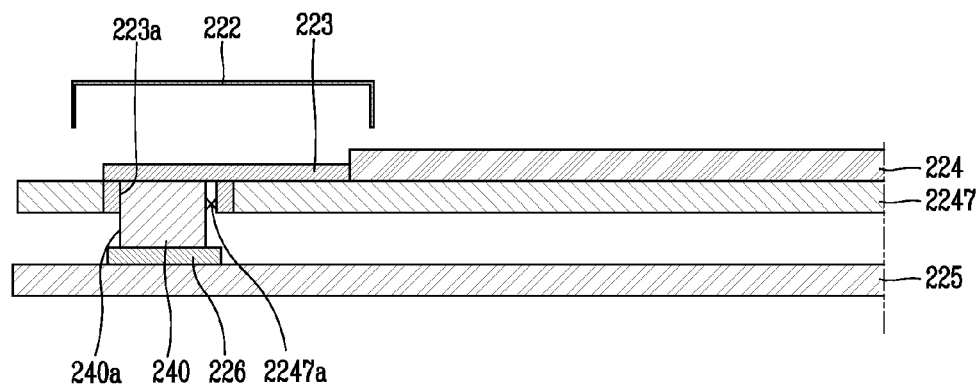

FIGS. 10A-10E and 11A-11B are cross-sectional diagrams of the connector and the LCD circuit board according to one embodiment of the present invention that are connected to each together. The conductive region 240a of the connection 240 according to one embodiment of the present invention is connected to one of an upper surface, a lower surface and a flank surface of the LCD circuit board 223, FIG. 10A illustrates that the conductive region 240a of the connector 240 is connected to the upper surface of the LCD circuit board 223. FIG. 10B illustrates that the LCD circuit board 224 is connected to an upper surface of the connector 240. FIG. 10C illustrates that the LCD circuit board 223 is connected to a flank surface of the connector 240, In addition, FIG. 10D illustrates another example in which the conductive pad 223a of the LCD circuit board 223 is formed in the second through hole 2247a and the conductive pad 223a is connected to the flank surface of the connector 240. FIG. 11D illustrates that the LCD circuit board 223 and the printed circuit board 225 are connected to each other without through hole 2247a being formed in base member 2247.

Figure 10E:
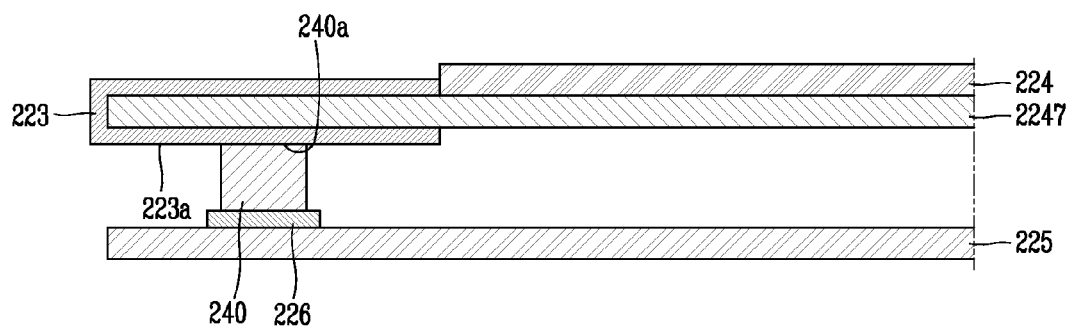

Particularly, because the through hole is not formed in FIG. 10E, the LCD circuit board 223 is formed in such a manner as to enclose an outside surface of the base member 2247, and extends to one portion of a lower surface of the base member 2247. At this point, the LCD circuit board 223 may be a flexible printed circuit board.

In addition, an upper protrusion wing 2401 and a lower protrusion wing 2402 may be provided on the upper surface and the lower surface of the connector 240. Thus, the upper protrusion wing 2401 and the lower protrusion wing 2402 may be connected to the conductive pad 223a of the LCD circuit board 223 and the conductive pad 226 of the printed circuit board 225, respectively.

Figure 11A:
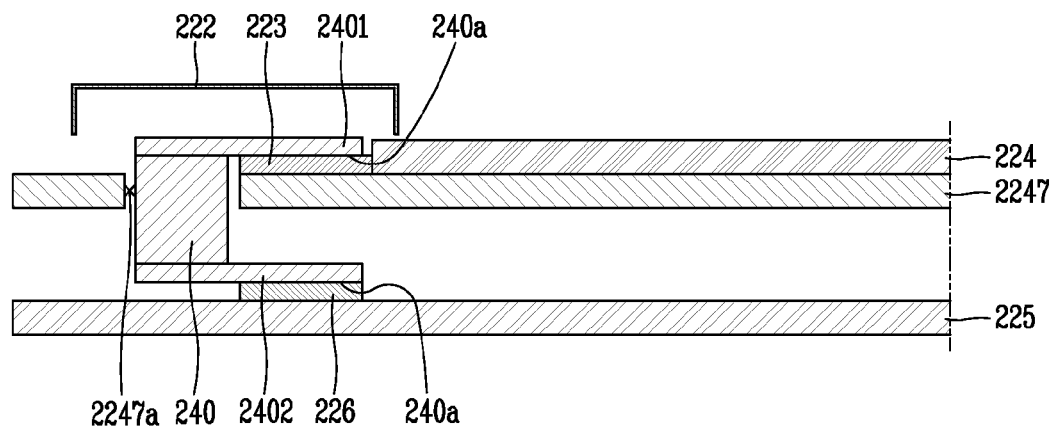
Figure 11B:
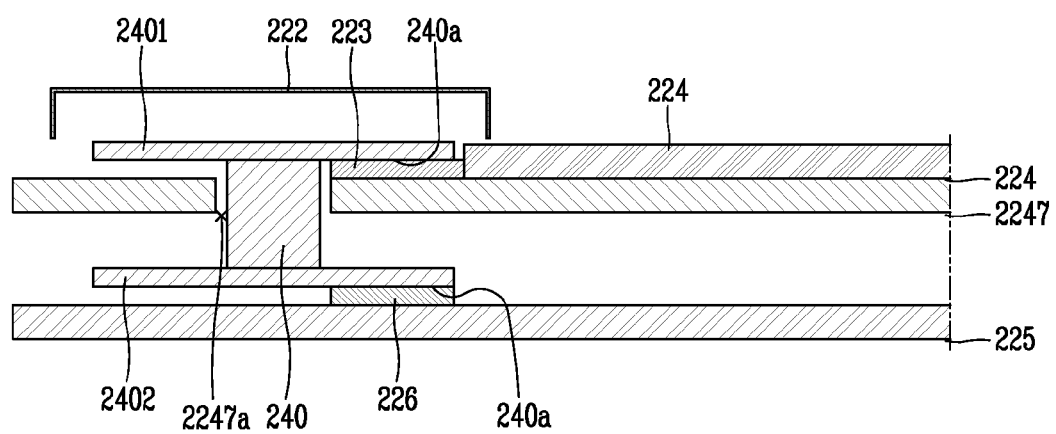

The connector 240 with the upper protrusion wing 2401 and the lower protrusion wing 2402 is "C"-shaped or "H"-shaped. FIG. 11A illustrates that the connector 240 with the upper protrusion wing 2401 and the lower protrusion wing 2402 is "C"-shaped. FIG. 11B illustrates that the connector 240 with the upper protrusion wing 2401 and the lower protrusion wing 2402 is "H"-shaped, At this point, in a case where the connection 240 with the upper protrusion wing 2401 and the lower protrusion wing 2402 is "C"-shaped, the conductive region 240a is formed along an outside surface of the connector 240, In contrast, in a case where the connection 240 with the upper protrusion wing 2401 and the lower protrusion wing 2402 is "H"-shaped, the conductive region 240a is formed on a lower surface of each of the lower and lower protrusion wings 2401 and 2402, and the conductive regions 240a are connected to the LCD circuit board 223 and the printed circuit board 225, respectively.

In this manner, the upper and lower protrusion wings 2401 and 2402 are formed on an upper portion and a lower portion of the connector 240, respectively, and thus when insertion into the base member 2247 is done, an additional process is unnecessary and fixation is easily done.

Figure 12:
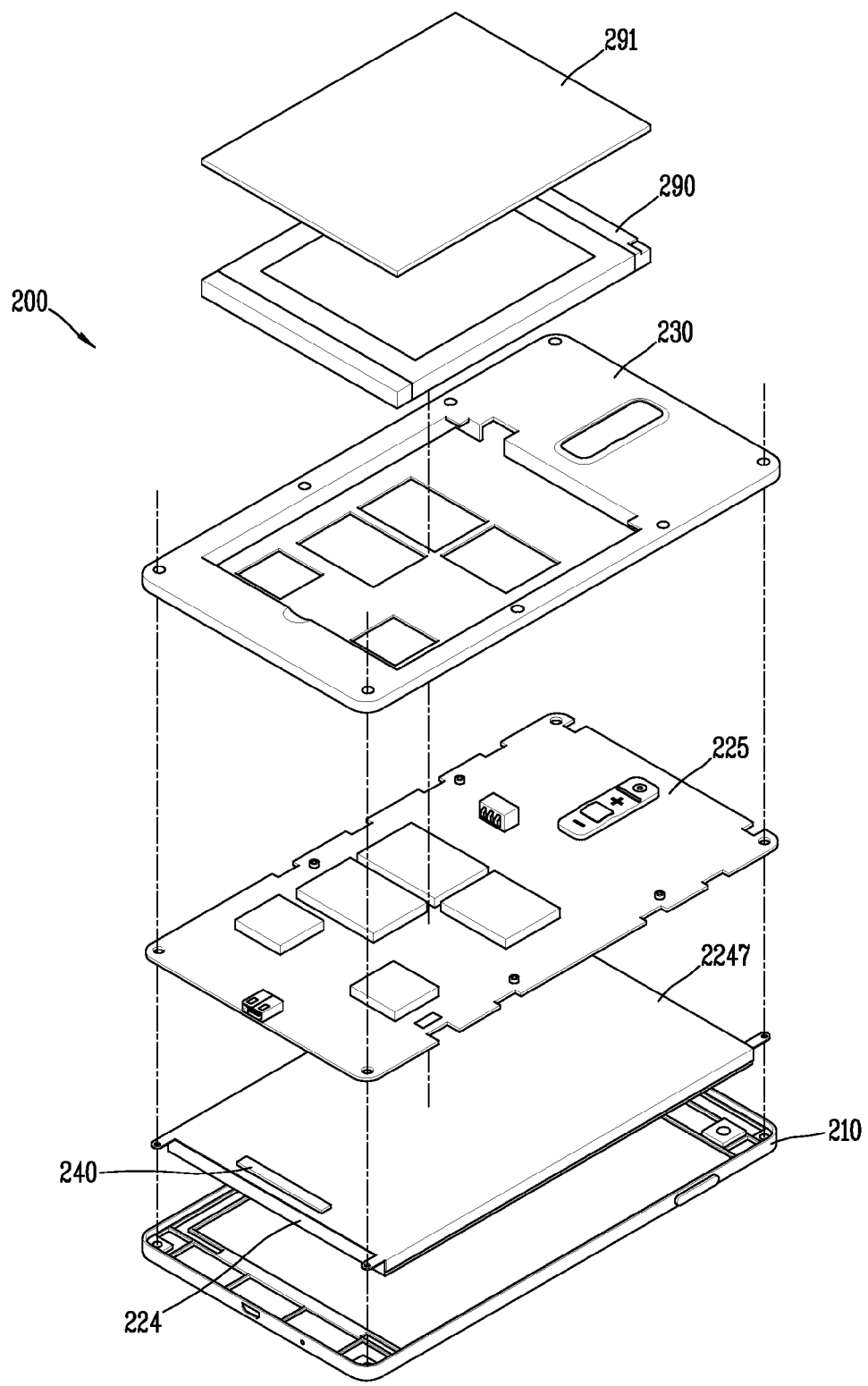
FIG. 12 is a perspective exploded diagram of a lower portion of the mobile terminal according to one embodiment of the present invention.

FIG. 12 is a perspective exploded diagram of a lower portion of the mobile terminal according to one embodiment of the present invention. FIG. 12 illustrates that the connection 240 that is formed in such a manner as to pass through the base member 2247 that is positioned on a lower surface of the LCD module 224 is connected to the printed circuit board 225 and the LCD module 224.

Figure 13A:
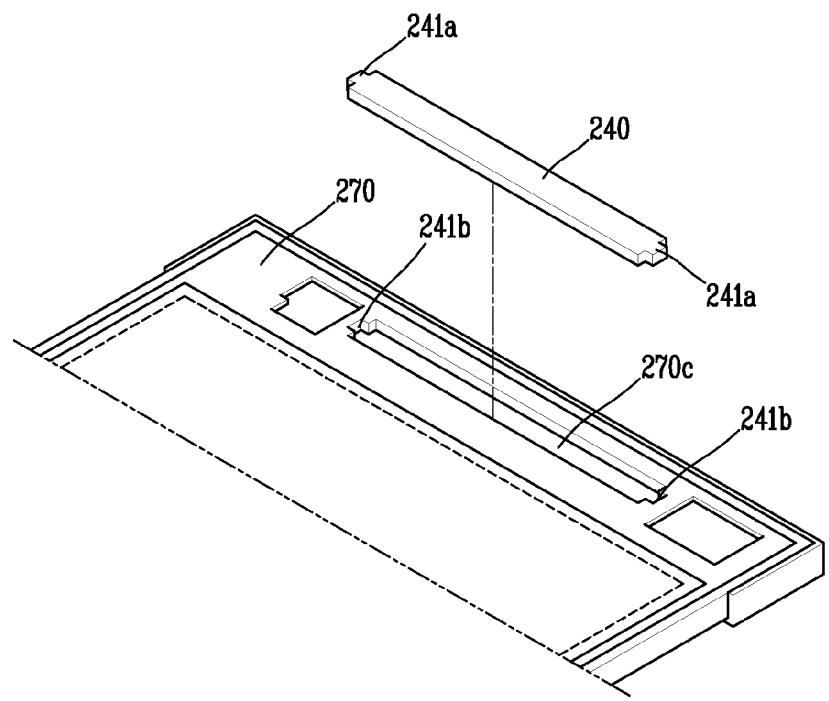
FIGS. 13A and 13D are diagrams for describing a combination of the connector and a mold according to one embodiment of the present invention.
Figure 13B:
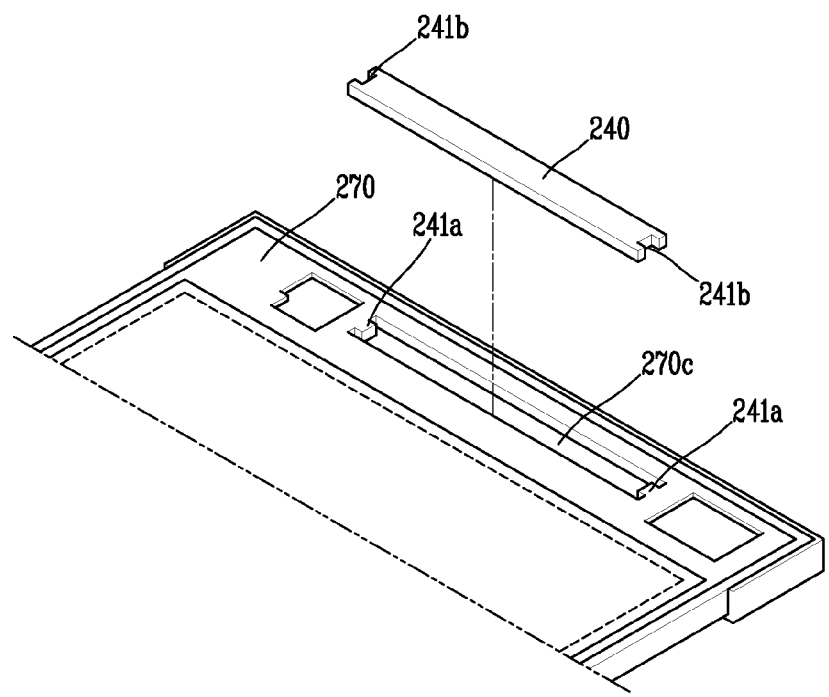

On the other hand, a protrusion 241a or a groove 241b is formed on or in both ends or on or in a middle portion of the connector 240 according to one embodiment of the present invention, and a groove 241b or a protrusion 241a is formed on or in the guide panel 270. This configuration makes it possible to insert the connector 240 into the guide panel 270 and thus to hold the connector 240 in place, More specifically, as illustrated in FIG. 13A, the protrusion 241a is formed on each of the both ends of the connector 240, and the grooves 241b are correspondingly formed in the guide panel 270. Thus, the connector 240 is inserted into the guide panel 270 and thus is held in place, Reversely, as illustrated in FIG. 13B, the groove 241b is formed in each of the both ends of the connector 240, and the protrusions 241a are correspondingly formed on the guide panel 270. Thus connector 240 is inserted into guide panel 270.

Figure 13C:
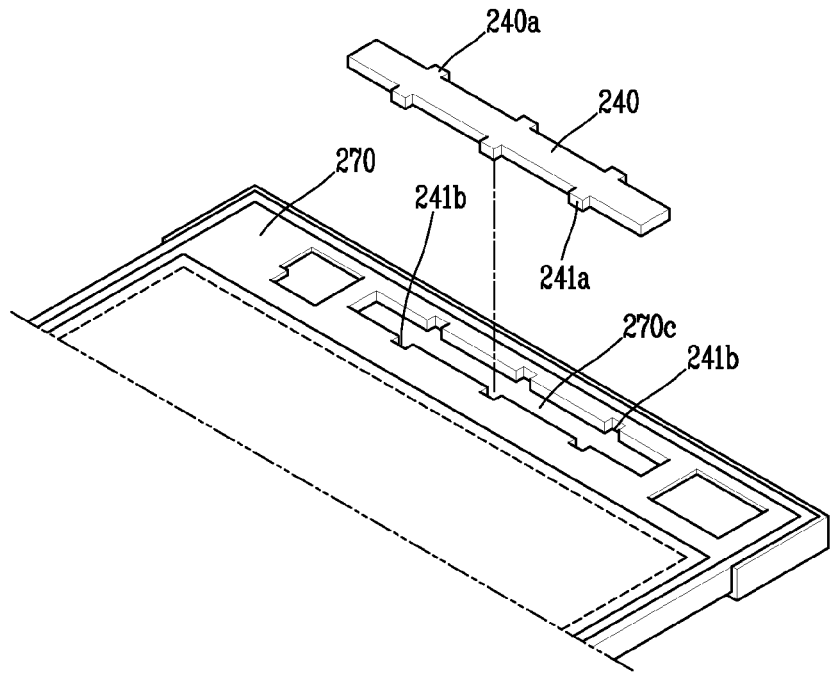

In addition, as illustrated in FIG. 13C, the multiple protrusions 241a are formed on the middle portion of the connector 240, and the grooves 241b are correspondingly formed in the guide panel 270. Thus, combinations of the protrusions 241a and the grooves 241a make it possible to fix the connector 240.

Figure 13D:
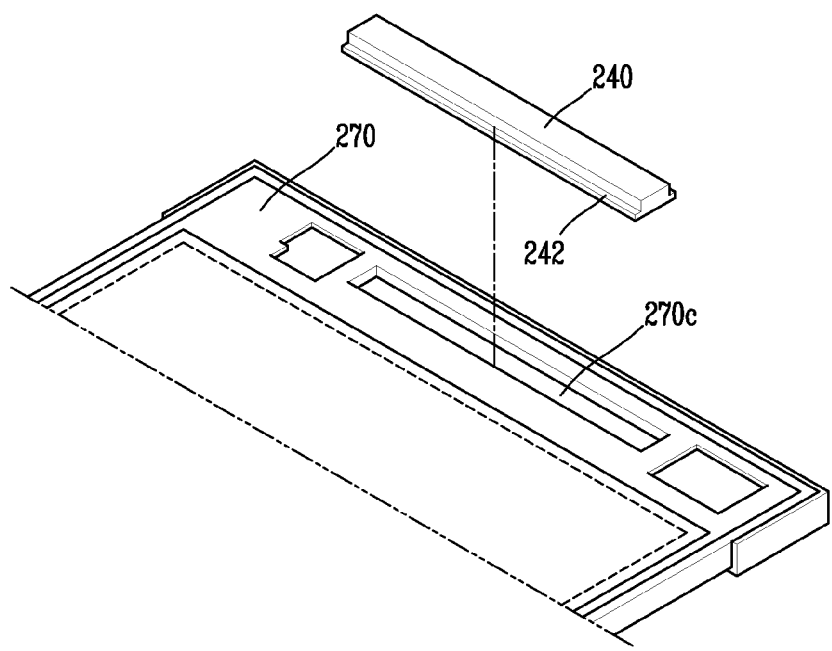

Additionally, according to one embodiment of the present invention, a step 252 may be formed on the connector 240 in the vertical direction to prevent the connector 240 from leaving to the outside, As illustrated in FIG. 13D, the connector 240 is in the shape of an inverted-T. This shape prevents the connector 240 from easily slipping off through the through hole 270c.

On the other hand, the LCD panel 2242 of the LCD module 224 may be a touch in cell LCD, and the LCD panel 2242 and the window 211 can be combined with each other with a transparent adhesive such an optically clear adhesive or an optically clear resin.

Figure 15:
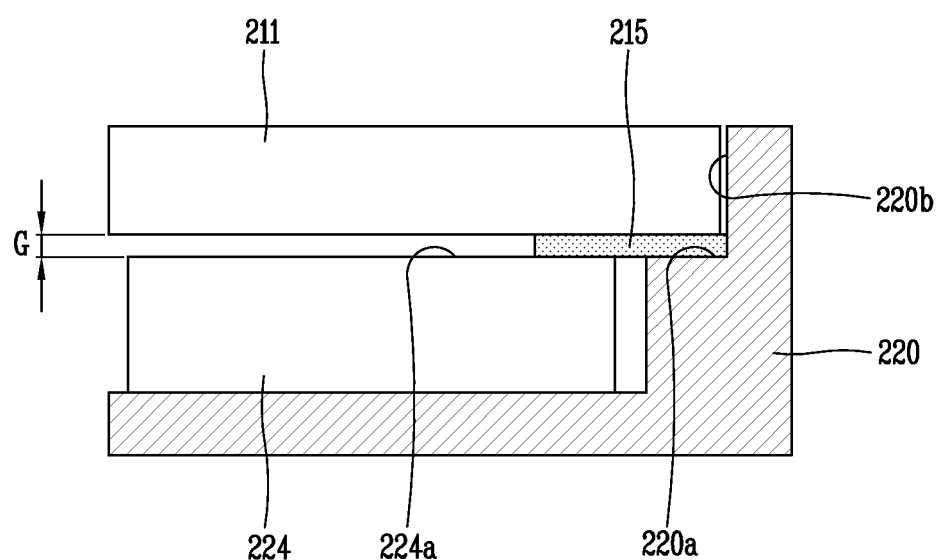
FIG. 15 is a cross-sectional diagram of one portion of the mobile terminal according to the one embodiment.

However, if the OCA or the OCR is not used, this provides an advantage of saving a material cost and simplifying the process, More specifically, as illustrated in FIG. 15, an air gap G may be formed between the window 211 and the LCD module 224, and an adhesive sheet 215 that reinforce the strength to prevent warping may be provided on an end of the window 211, At this point, the adhesive sheet 215 has a hole in the center.

Figure 16:
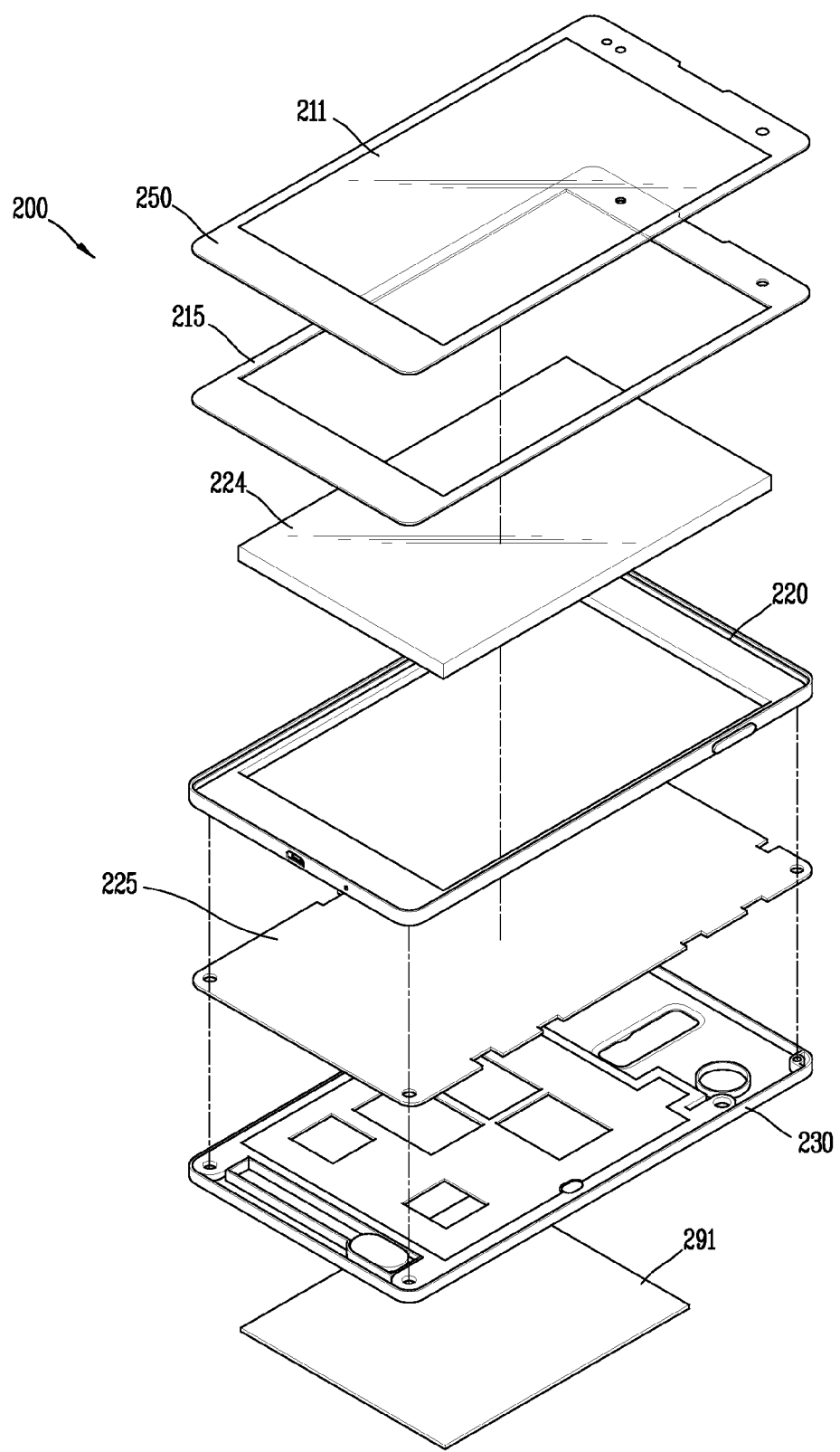
FIG. 16 is a perspective exploded diagram of the mobile terminal according to one embodiment of the present invention.

FIG. 16 is a perspective exploded diagram of the mobile terminal according to one embodiment of the present invention. FIG. 16 illustrates that the adhesive sheet 215 that has the hole in the center is provided between the window 211 and the LCD module 224. Referring to FIG. 16, the adhesive sheet 215 is provided under the window 211 and sticks the LCD module 224 and the window 211. The LCD module 224 is accommodated within a front case 220, At this point, the window 211 and the adhesive sheet 215 are almost the same in shape and size, and an image display region (active region) is limited by the adhesive sheet 215.

The LCD module 224 and the printed circuit board 225 are electrically connected to each other, the front case 220 is connected to the second cover 230, along with the printed circuit board 225, A battery cover 291 is provided on a lower surface of the second cover 230, FIG. 16 is a diagram for describing the air gap G. The connected state of the connection 240 is as described above, and thus a detailed illustration is omitted.

Referring to FIG. 15, the LCD module 224 is accommodated within the front case 220, the front case 220 has a step that is configured from a vertical surface 220b that a flank surface of the window 211 is brought into contact with and a horizontal surface 220a on which the adhesive sheet 215 is nested, and the adhesive sheet 215 is placed on an upper surface 224a of the LCD module 224, which is formed adjacent to the horizontal surface 220a, That is, a height of the LCD module 224 and the horizontal surface 220a of the front case 220 are the same and thus the adhesive sheet 215 is horizontally placed.

Tolerance in the assembly of the component can be reduced by using the adhesive sheet 215 in this manner, and this touch performance can be improved.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A electronic device comprising:
    an LCD module arranged under a window;
    an LCD circuit board arranged to one side of the LCD module to electrically control the LCD module;
    a printed circuit board formed apart from the LCD circuit board, positioned under the LCD module and the LCD circuit board, and electrically connected to the LCD circuit board; and
    a connector electrically connecting the LCD circuit board and the printed circuit board,
    wherein multiple conductive pads arranged at a predetermined distance are formed on the LCD circuit board and the printed circuit board, respectively,
    wherein conductive regions and non-conductive regions are formed on the connector alternately, and
    wherein the conductive regions are connected to the conductive pads formed on the LCD circuit board and the printed circuit board, respectively.

2. The electronic device of claim 1, wherein the connector is inserted into a guide panel that has a first through hole, and thus is fixed,
    wherein a base member is arranged between the LCD circuit board and the printed circuit board,
    wherein a second through hole that communicates with the first through hole is formed in the base member, and
    wherein the connector passes through the first through hole and the second through hole.

3. The electronic device of claim 2, wherein the LCD module includes an LCD panel including a polarizing plate and a color filter substrate, and a back light unit that is arranged under the LCD panel to supply light to the LCD panel, and
    wherein a drive IC chip driving the LCD module is provided between the LCD panel and the LCD circuit board.

4. The electronic device of claim 3, wherein a cover that covers the LCD circuit board is provided between the window and the LCD circuit board.

5. The electronic device of claim 4, wherein both end portions of the cover extend downward, and
    wherein hooks formed on both ends of the cover are inserted into grooves formed in the guide panel.

6. The electronic device of claim 3, wherein the backlight unit includes LEDs,
    wherein an LED circuit board that controls the LED is connected to the LCD circuit board, and
    wherein LED nesting portions in which the LEDs are received are formed in the guide panel.

7. The electronic device of claim 3, wherein the drive IC chip and components mounted onto the LCD circuit board are connected with each other by connection lines.

8. The electronic device of claim 7, wherein, the drive IC chip and the components mounted onto the LCD circuit board are arranged on regions that correspond to each other when the drive IC chip and the LCD circuit board are separated, respectively.

9. The electronic device of claim 2, wherein components that are mounted onto one surface of the LCD circuit board are formed to one side or both sides of the connector.

10. The electronic device of claim 9, wherein the conductive region is connected to one of an upper surface, a lower surface, a flank surface of the conductive pad of the LCD circuit board.

11. The electronic device of claim 9, wherein an upper protrusion wing and a lower protrusion wing are provided on an upper surface and a lower surface, respectively, and are connected to the conductive pads of the LCD circuit board and the conductive pads of the printed circuit board, respectively.

12. The electronic device of claim 11, wherein the connector is "C"-shaped or "H"-shaped by the upper protrusion wing and the lower protrusion wing.

13. The electronic device of claim 1, wherein a base member is arranged between the LCD circuit board and the printed circuit board, wherein the LCD circuit board is formed to a portion of a bottom surface of the base member, enclosing an end portion of the base member, and wherein the connector is connected to a lower surface of the LCD circuit board.

14. The electronic device of claim 1, wherein a groove is formed in at least one of the LCD circuit board and the printed circuit board, and wherein the conductive pad protruded in the groove is electrically connected to the conductive region of the connector.

15. The electronic device of claim 14, wherein the conductive pad is formed on a flank surface or a bottom surface of the groove.

16. The electronic device of claim 15, wherein the conductive pad is in the form of an elastic semi-sphere or in the form of a plate.

17. The electronic device of claim 1, wherein a protrusion or a groove is formed on or in both ends or a middle portion of the connector, and a groove or a protrusion is formed in or on the guide panel, and wherein the connector is inserted into the guide panel and thus is held in place.

18. The electronic device of claim 1, wherein the connector has a step along the vertical direction in order to prevent the connector from leaving from the guide panel.

19. The electronic device of claim 1, wherein the connector includes a first arrangement is formed of the alternating multiple conductive regions and non-conductive regions, a second arrangement that is formed of the alternating multiple non-conductive regions and multiple conductive regions, and an insulating layer that is positioned between the first arrangement and the second arrangement to provide electrical insulation between the first arrangement and the second arrangement.

20. A electronic device comprising:

a window;

an LCD module arranged under the window;

a touch sensor sensing a touch input applied to the window;

an LCD circuit board arranged to one side of the LCD module to electrically control the LCD module;

a printed circuit board electrically connected to the LCD circuit board; and a connector electrically connecting the LCD circuit board and the printed circuit board, wherein multiple conductive pads arranged at a predetermined distance are formed on the LCD circuit board and the printed circuit board, respectively, wherein conductive regions and non-conductive regions are formed on the connector alternately, and wherein the conductive regions are connected to the conductive pads formed on the LCD circuit board and the printed circuit board, respectively.

* * * * *